(12) United States Patent
Chen et al.

(10) Patent No.: US 8,947,453 B2
(45) Date of Patent: Feb. 3, 2015

(54) METHODS AND SYSTEMS FOR MOBILE DOCUMENT ACQUISITION AND ENHANCEMENT

(75) Inventors: Lawrence Shao-hsien Chen, Vancouver, WA (US); Richard John Campbell, Camas, WA (US); Ahmet Mufit Ferman, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 225 days.

(21) Appl. No.: 13/078,070

(22) Filed: Apr. 1, 2011

(65) Prior Publication Data

US 2012/0249554 A1   Oct. 4, 2012

(51) Int. Cl.
*G09G 5/00* (2006.01)
*H04N 3/02* (2006.01)
*H04N 17/02* (2006.01)
(Continued)

(52) U.S. Cl.
CPC .......... *G06K 9/3233* (2013.01); *G06K 9/00979* (2013.01); *G06K 2209/01* (2013.01); *G06T 9/00* (2013.01)
USPC ...... 345/629; 345/156; 348/333.02; 348/190; 348/195

(58) Field of Classification Search
CPC .............................. G06T 9/00; G06T 2200/24
USPC .............. 345/629, 156; 348/333.02, 190, 195
See application file for complete search history.

(56) References Cited

U.S. PATENT DOCUMENTS 7,023,483 B2   4/2006   Pollard et al.
7,181,061 B2   2/2007   Kawano et al.
(Continued)

FOREIGN PATENT DOCUMENTS

EP   1503581 A2   2/2005
GB   2386278 A    9/2003
(Continued)

OTHER PUBLICATIONS

Japanese Office Action—Patent Application No. 2012-070181—Mailing Date: Dec. 4, 2012.
(Continued)

*Primary Examiner* — Jeffrey Chow
(74) *Attorney, Agent, or Firm* — Kristine Elizabeth Matthews; David C. Ripma (57) ABSTRACT

Aspects of the present invention are related to systems and methods for correcting artifacts in a camera-captured image of a document or image of an object exhibiting document-like content. A mobile device may capture an image and send the image to a cloud computing system for processing. According to a first aspect of the present invention, the mobile device may provide real-time feedback cues to assist in the capture of an image. The mobile device may detect a region-of-interest in the captured image, and a user may refine or confirm the detected region-of-interest. The captured image, information identifying the region-of-interest and a metadata tag, referred to as a region-of-interest modification tag, indicating whether, or not, the region-of-interest was refined by a user may be sent to the cloud. The cloud may process the image giving priority to the region-of-interest received from the handset when the region-of-interest modification tag indicates that the region-of-interest was refined by a user over a cloud determined region-of-interest. The cloud may transmit, to the handset, the processing results.

31 Claims, 5 Drawing Sheets

(51) Int. Cl.
*H04N 5/222* (2006.01)
*G06K 9/32* (2006.01)
*G06K 9/00* (2006.01)
*G06T 9/00* (2006.01)

(56) References Cited

U.S. PATENT DOCUMENTS

| | | |
|---|---|---|
| 7,593,605 B2 | 9/2009 | King et al. |
| 7,639,897 B2 | 12/2009 | Gennetten et al. |
| 7,640,037 B2 | 12/2009 | Mutz et al. |
| 7,698,392 B2 | 4/2010 | Zapata et al. |
| 7,735,731 B2 | 6/2010 | Skaaksrud et al. |
| 7,742,073 B1 | 6/2010 | Cohen-Solal et al. |
| 7,742,953 B2 | 6/2010 | King et al. |
| 7,773,120 B2 | 8/2010 | Simon |
| 7,986,346 B2 | 7/2011 | Kaneda et al. |
| 8,249,382 B2 | 8/2012 | Teshima et al. |
| 2003/0152263 A1 | 8/2003 | Kawano et al. |
| 2004/0125220 A1* | 7/2004 | Fukuda et al. .......... 348/234 |
| 2005/0024517 A1 | 2/2005 | Luciano |
| 2006/0103731 A1 | 5/2006 | Pilu et al. |
| 2006/0221198 A1 | 10/2006 | Fry et al. |
| 2007/0172151 A1 | 7/2007 | Gennetten et al. |
| 2007/0212040 A1 | 9/2007 | Kosako |
| 2007/0273750 A1 | 11/2007 | Tanaka |
| 2008/0254827 A1 | 10/2008 | Hunter |
| 2009/0183085 A1* | 7/2009 | Pasetto et al. ............ 715/744 |
| 2009/0202169 A1* | 8/2009 | Hayashi .................. 382/264 |
| 2009/0247219 A1 | 10/2009 | Lin et al. |
| 2009/0300068 A1 | 12/2009 | Tang |
| 2010/0054605 A1 | 3/2010 | Molnar et al. |
| 2010/0128131 A1 | 5/2010 | Tenchio et al. |
| 2010/0296583 A1* | 11/2010 | Li .......................... 375/240.24 |
| 2010/0316295 A1 | 12/2010 | Morimoto |
| 2011/0074966 A1 | 3/2011 | Cerosaletti et al. |
| 2011/0161862 A1* | 6/2011 | Hibi et al. ................ 715/781 |
| 2011/0193978 A1* | 8/2011 | Wu et al. ................ 348/208.6 |
| 2011/0206249 A1* | 8/2011 | Mathew ................... 382/128 |
| 2011/0255762 A1* | 10/2011 | Deischinger et al. ........ 382/131 |
| 2012/0026378 A1 | 2/2012 | Pang et al. |
| 2012/0086792 A1* | 4/2012 | Akbarzadeh et al. ........... 348/77 |
| 2012/0148125 A1* | 6/2012 | Dekel ....................... 382/128 |

FOREIGN PATENT DOCUMENTS

| | | |
|---|---|---|
| GB | 2399184 A | 9/2004 |
| GB | 2419488 A | 4/2006 |
| JP | 2001-326837 A | 11/2001 |
| JP | 2005-006255 A | 1/2005 |
| JP | 2007-243384 A | 9/2007 |
| WO | 02/37179 A2 | 5/2002 |

OTHER PUBLICATIONS

USPTO Office Action—U.S. Appl. No. 13/078,052—Notification Date Nov. 25, 2013.

* cited by examiner

METHODS AND SYSTEMS FOR MOBILE DOCUMENT ACQUISITION AND ENHANCEMENT

FIELD OF THE INVENTION

Embodiments of the present invention relate generally to the areas of image acquisition and image enhancement and, in particular, to methods and systems for correcting artifacts in a camera-captured image of a document or image of an object exhibiting document-like content.

BACKGROUND

With the proliferation of digital cameras and camera-equipped mobile devices, a user may capture an image, referred to as a document image, of a document, or of an object displaying document-like content, for example, a sign, a whiteboard, a poster, a projected slide and other objects displaying document-like content. The captured document image may be provided as input to a traditional, document-processing workflow, for example, printing, optical character recognition (OCR), compression, archival and other document processing workflow processes. However, unlike a document image obtained using a scanner, a camera-captured document image may contain clutter with spurious content in the image background. Furthermore, a camera-captured image may suffer from artifacts related to, for example, poor resolution, non-uniform illumination, glare, optical distortion, perspective distortion and other artifact-generating issues. The elimination of artifacts in a camera-captured document may require considerable computation resources and may require a captured image of sufficient quality in order to effectively correct the artifacts. Methods and systems enabling a user to capture an image of sufficient quality and providing sufficient computation resources for artifact removal may be desirable.

SUMMARY

Embodiments of the present invention comprise methods and systems for correcting artifacts in a camera-captured image.

According to a first aspect of the present invention, a handset may capture an image, determine a region-of-interest and form a metadata tag indicative of whether, or not, the region-of-interest has been user refined. The image, a location identifier associated with the region-of-interest and the metadata tag may be transmitted from the handset to a cloud. A cloud-processed result may be received at the handset from the cloud.

According to a second aspect of the present invention, a cloud may receive, from a handset, an image, a region-of-interest identifier and a metadata indicating whether, or not, the region-of-interest has been user refined. The image may be processed at the cloud, and a cloud-processed result may be transmitted to the handset.

The foregoing and other objectives, features and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or a computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

With the proliferation of digital cameras and camera-equipped mobile devices, a user may capture an image, referred to as a document image, of a document, or of an object displaying document-like content, for example, a sign, a whiteboard, a poster, a projected slide and other objects displaying document-like content. The captured document image may be provided as input to a traditional, document-processing workflow, for example, printing, optical character recognition (OCR), compression, archival and other document processing workflow processes. However, unlike a document image obtained using a scanner, a camera-captured document image may contain clutter with spurious content in the image background. Furthermore, a camera-captured image may suffer from artifacts related to, for example, poor resolution, non-uniform illumination, glare, optical distortion, perspective distortion and other artifact-generating issues. The elimination of artifacts in a camera-captured document may require considerable computation resources and may require a captured image of sufficient quality in order to effectively correct the artifacts. Methods and systems enabling a user to capture an image of sufficient quality and providing sufficient computation resources for artifact removal may be desirable.

Cloud computing may refer to a computing system, also referred to as a cloud, wherein shared resources, software and information are provided to computing devices on-demand via the internet. Mobile cloud computing may take advantage of the connectivity of mobile devices to access the cloud. Applications in the form of light-weight programs, for example, widgets and other computationally inexpensive programs, may run on mobile devices and serve as a front end to collect and to transfer data to the cloud, wherein most of the power of infrastructure, processing and data storage reside.

Smart phones, for example, the iPhone, Android phones and other smart phones, have experienced rapid development in recent years. In many cases, the processing power and graphics capabilities in a smart phone may rival those of a small computer from just a few years ago. Smart phones may have the advantage of being portable and ubiquitous. Also the immediacy and interactivity via the touch screen and other sensors, for example, accelerometers, may make it easier to interact with the content on the smart-phone display. Additionally, a smart phone may be equipped with one or more cameras, making the smart phone an ideal image-capturing device. Connectivity, via WiFi or a cellular network, may allow a smart phone to communicate with a cloud through various means, for example, a direct connection, for example, SSL, email and other methods of direct connection.

In some document processing systems, processing takes place entirely in the cloud, for example, ScanR, wherein a user captures an image and transmits it to an on-line service for processing. A disadvantage with an entirely cloud-based document processing system may be that the user does not see the processing result until it is sent back to the handset.

There are also document processing systems wherein the processing is entirely done on the handset, for example, DocScanner and ScannerPro applications, also referred to as apps, on the iPhone and Android phones. These entirely handset-based document processing systems are limited by the available computing resources of the handset, for example, CPU power, memory and other computing resources. The limited resources may not be adequate to process full-resolution images, for example, images that are commonly in the five megapixel range.

Figure 1:
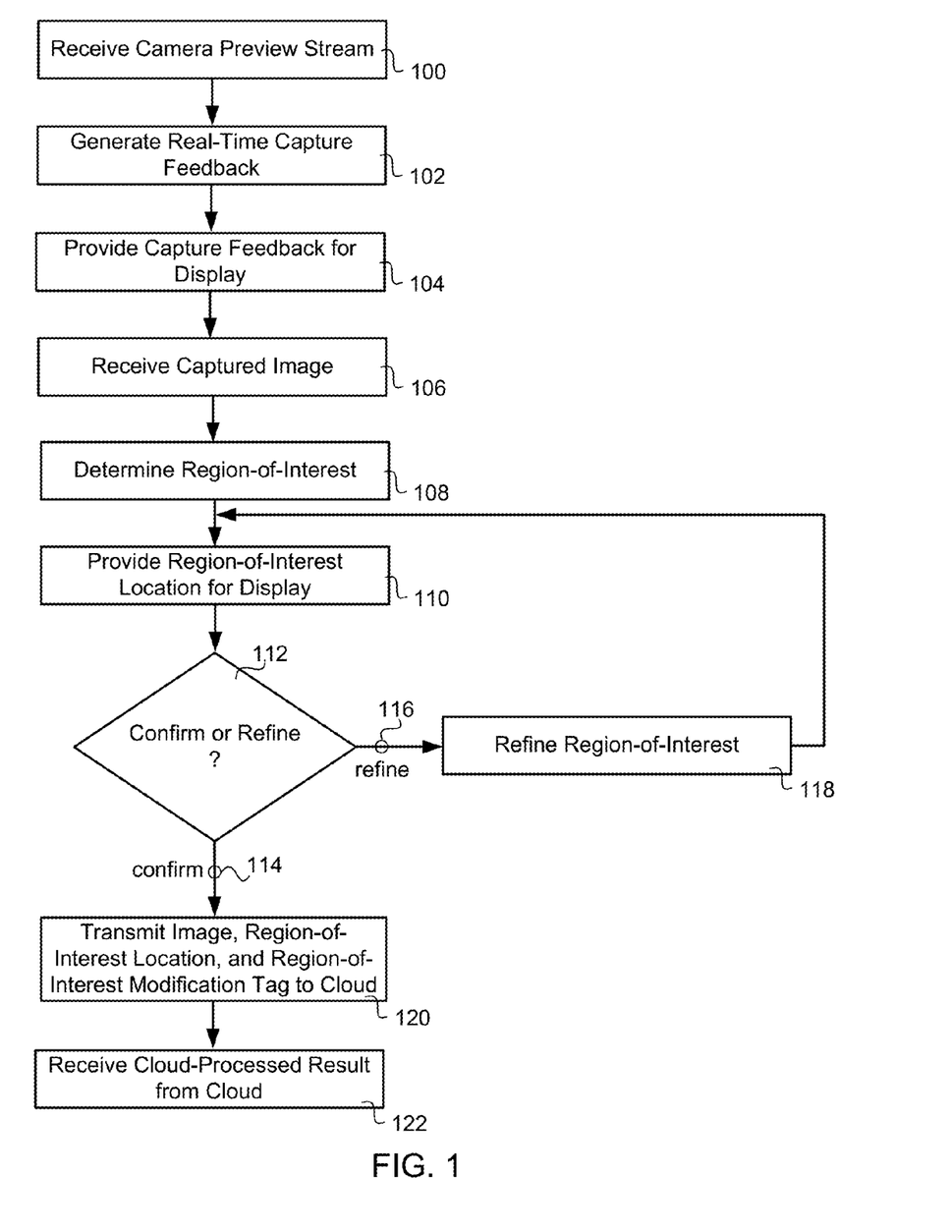
FIG. 1 is a chart showing exemplary embodiments of the present invention comprising transmission of an image captured at a handset in conjunction with real-time feedback, a region-of-interest location and a region-of-interest modification tag, from the handset to a cloud, for processing at the cloud.

In some embodiments of the present invention, which may be understood in relation to FIG. 1, the processing may be divided into two components: a handset-based processing component and a cloud-based processing component. In these embodiments, a handset may comprise an image-acquisition component, for example, a still camera, a display device and onboard processing capabilities.

Within the handset, a camera preview stream may be received 100 by a processing application. Real-time capture feedback may be generated 102. In some embodiments of the present invention, real-time capture feedback may be generated 102 according to methods and systems disclosed in U.S. patent application Ser. No. 13/078,052, entitled "Methods and Systems for Real-Time Image-Capture Feedback," invented by Lawrence Shao-hsien Chen, filed on Apr. 1, 2011, said U.S. patent application Ser. No. 13/078,052 is hereby incorporated herein by reference in its entirety. The generated capture feedback may be provided 104 for display on the display device of the handset.

A captured image may be received 106 by the processing application. A region-of-interest may be determined 108 in the captured image. In some embodiments of the present invention, the region-of-interest may be determined 108 according to methods and systems disclosed in U.S. patent application Ser. No. 13/034,594, entitled "Methods and Systems for Determining a Document Region-of-Interest in an Image," invented by Ahmet Mufit Ferman and Lawrence Shao-hsien Chen, filed on Feb. 24, 2011, said U.S. patent application Ser. No. 13/034,594 is hereby incorporated herein by reference in its entirety. The location of the region-of-interest may be provided 110 for display on the display device of the handset. The location of the region-of-interest may be indicated by bounding lines, corner points, a mask image and/or other region-of-interest identifying information.

Figure 2:
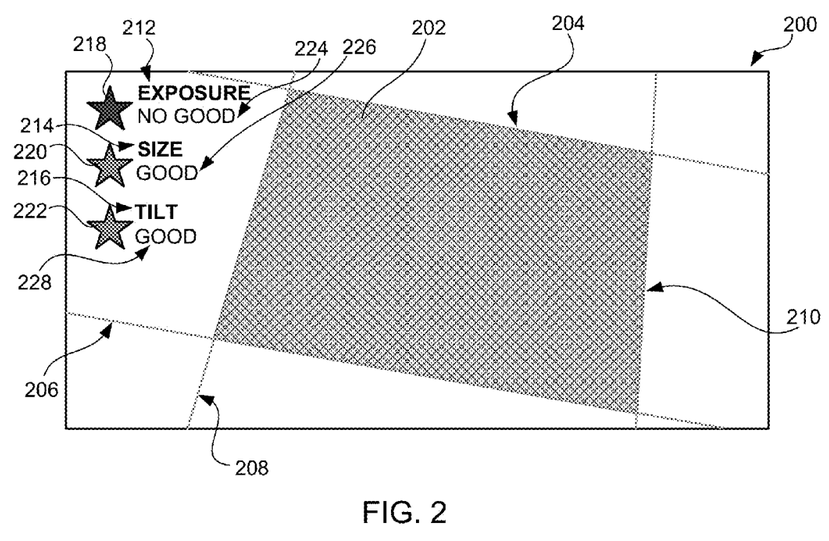
FIG. 2 is a picture depicting an exemplary rendering of an overlaid preview-frame image comprising acquisition cues.

An exemplary preview-frame image overlaid with capture feedback, also referred to as capture cues, and a region-of-interest is depicted in FIG. 2. FIG. 2 shows a camera preview display 200. A document region 202, shown in cross-hatch, has been detected, and boundary lines 204, 206, 208, 210 have been superimposed on the preview-frame image. Additionally, capture cues have been overlaid on the preview-frame image. In particular, cues are displayed for three acquisition factors: "EXPOSURE," "SIZE" and "TILT," which are indicated by corresponding factor labels 212, 214, 216, respectively. In proximity to each factor label 212, 214, 216 is an iconic indicator, 218, 220, 222, respectively, and a textual indicator, 224, 226, 228, respectively, of the acceptability of the acquisition-factor values. An exposure acquisition-factor value, "EXPOSURE," has been determined to fall outside of the acceptable limits, and the user is cued to this by an icon 218 of a color associated with unsatisfactory and a text string 224 indicating that the "EXPOSURE" value is "NO GOOD." A size acquisition-factor value, "SIZE," has been determined to fall within the acceptable limits, and the user is cued to this by an icon 220 of a color associated with satisfactory and a text string 226 indicating that the "SIZE" value is "GOOD." A tilt acquisition-factor value, "TILT," has been determined to fall within the acceptable limits, and the user is cued to this by an icon 222 of a color associated with satisfactory and a text string 228 indicating that the "TILT" value is "GOOD."

Referring to FIG. 1, the process may wait 112 for a user to confirm 114 the region-of-interest or refine 116 the region-of-interest. In some embodiments of the present invention, the user may refine 118 the region-of-interest by dragging, on the device display, a corner of the quadrilateral defining the region-of-interest to a new location. The refined region-of-interest location may be provided 110 for display on the display device of the handset, and the process may wait 112 for user confirmation 114 or further refinement 116.

Figure 3:
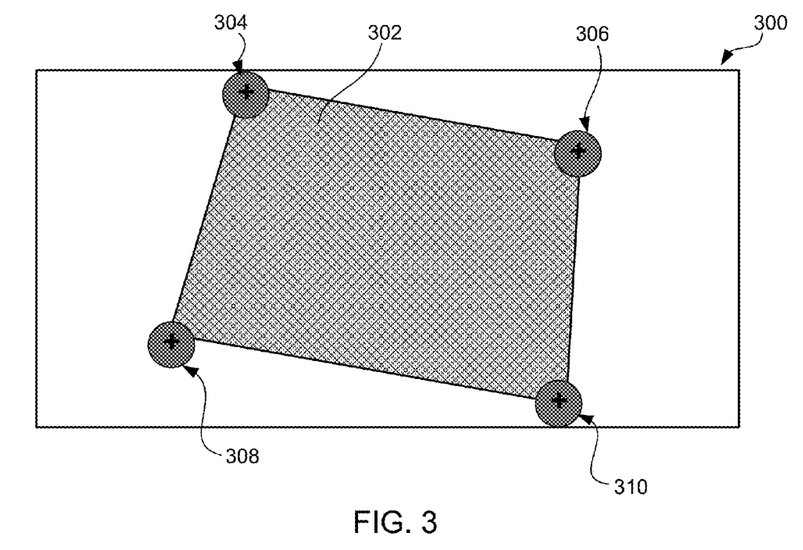
FIG. 3 is a picture depicting an exemplary rendering of a user-modifiable region-of-interest.

An exemplary preview-frame image overlaid with a refined region-of-interest is depicted in FIG. 3. FIG. 3 shows a camera preview display 300. A refined region-of-interest 302, shown in cross-hatch, is illustrated, along with four 304, 306, 308, 310 interactive hotspots for dragging a corner of the region-of-interest to refine its location.

Referring to FIG. 1, after confirmation of the region-of-interest, the full-resolution captured image, the location of the region-of-interest and a metadata tag, which may be referred to as a region-of-interest modification tag, indicating whether, or not, the user refined the region-of-interest may be transmitted 120 from the handset to cloud.

The handset may subsequently receive 122, from the cloud, a cloud-processed result.

Figure 4:
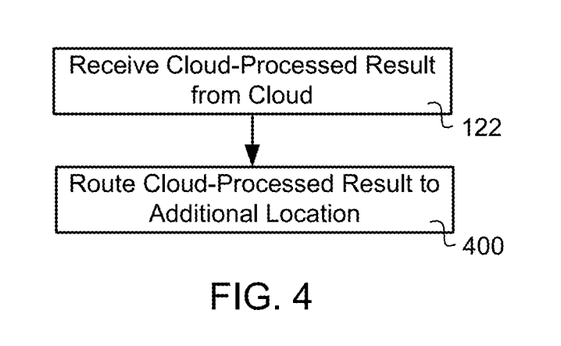
FIG. 4 is a chart showing exemplary embodiments of the present invention comprising routing, from the handset, cloud-processed results to an additional location.

In alternative embodiments, shown in FIG. 4, of the present invention, after the cloud-processed result is received 122 at the handset from the cloud, the cloud-processed result may be routed 400, by the handset, to an additional location, for example, another device, an email account, a storage location on the handset, a storage location remote to the handset and other locations.

Figure 5:
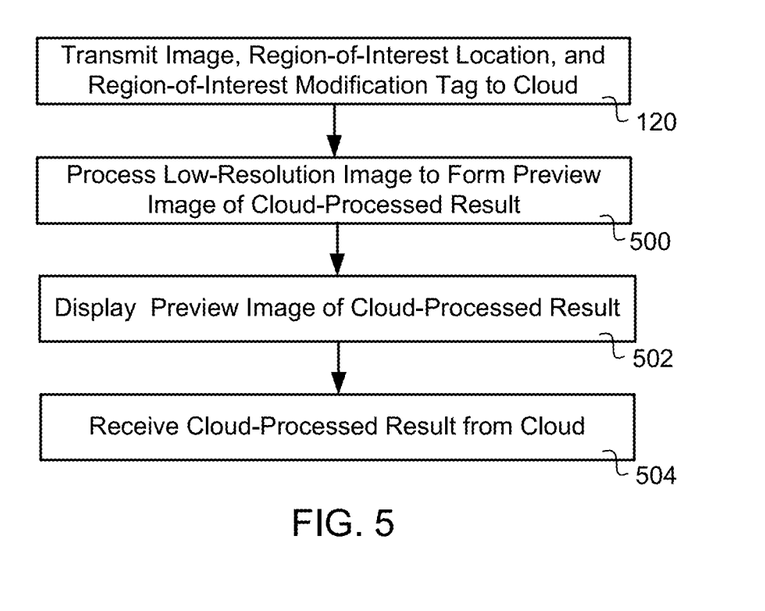
FIG. 5 is a chart showing exemplary embodiments of the present invention comprising displaying a preview of cloud-processing results based on processing, in the handset, of a low-resolution image.

In alternative embodiments, shown in FIG. 5, of the present invention, the full-resolution captured image, the location of the region-of-interest and a metadata tag indicating whether, or not, the user refined the region-of-interest may be transmitted 120 from the handset to cloud. Additionally, a low-resolution image of the captured image may be processed 500 at the handset to form a preview image of the cloud-processed results. Exemplary processing may include, tone correction, illumination correction, geometric correction, perspective distortion correction, sharpening, de-noising, de-blurring, resolution boosting, image enhancement, image restoration and other processing intended to generate a processed result of greater utility to an end-viewer. The preview image of the cloud-processed results may be displayed 502 on the display device of the handset, and the cloud-processed results may be received 504, from the cloud, at the handset.

Figure 6:
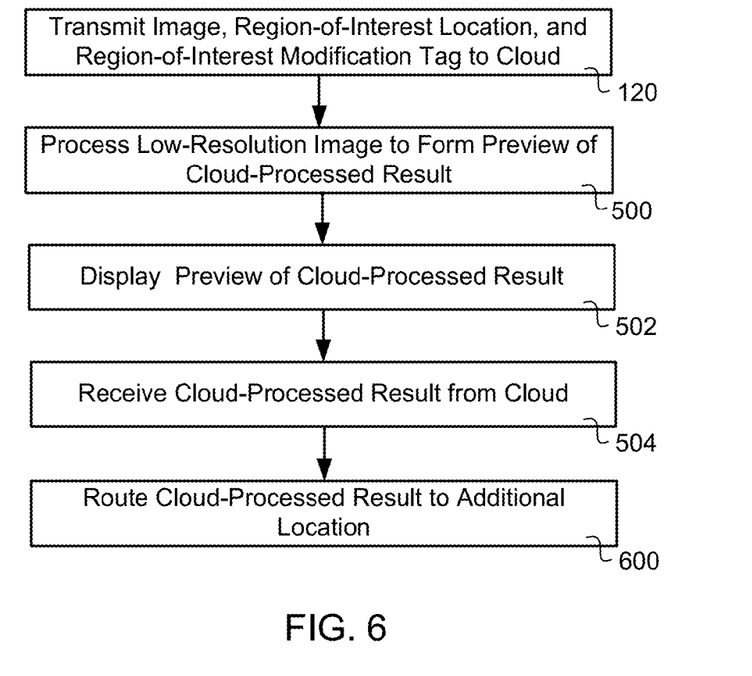
FIG. 6 is a chart showing exemplary embodiments of the present invention comprising displaying a preview of cloud-processing results based on processing, in the handset, of a low-resolution image and routing, from the handset, cloud-processed results to an additional location.

In alternative embodiments, shown in FIG. 6, of the present invention, the full-resolution captured image, the location of the region-of-interest and a metadata tag indicating whether, or not, the user refined the region-of-interest may be transmitted 120 from the handset to cloud. Additionally, a low-resolution image of the captured image may be processed 500 at the handset to form a preview image of the cloud-processed results. Exemplary processing may include, tone correction, illumination correction, geometric correction, perspective distortion correction, sharpening, de-noising, de-blurring, resolution boosting, image enhancement, image restoration and other processing intended to generate a processed result of greater utility to an end-viewer. The preview image of the cloud-processed results may be displayed 502 on the display device of the handset, and the cloud-processed results may be received 504, from the cloud, at the handset. The cloud-processed result may be routed 600, by the handset, to an additional location, for example, another device, an email account, a storage location on the handset, a storage location remote to the handset and other locations.

In some embodiments of the present invention, in addition to a metadata tag indicating whether, or not, a user refined the region-of-interest, the handset may transmit to the cloud additional metadata, for example, metadata describing the acquisition parameters related to the image capture, additional routing information and other metadata.

Figure 7:
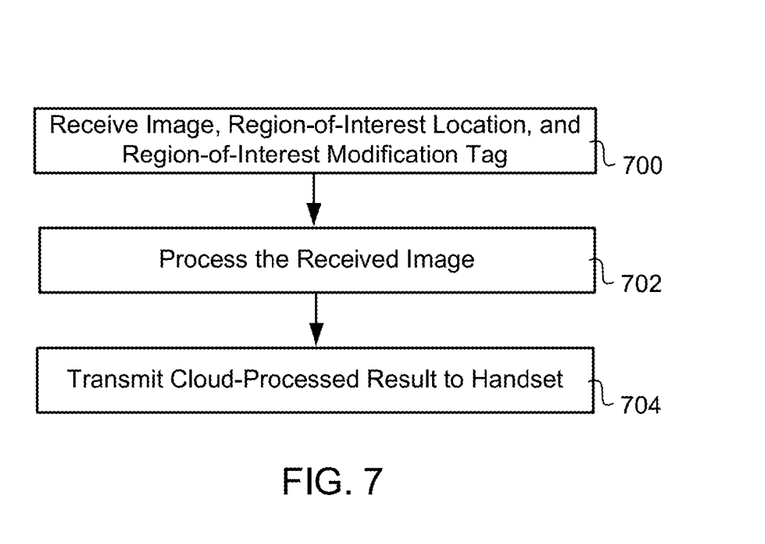
FIG. 7 is a chart showing exemplary embodiments of the present invention comprising processing an image received from a handset in a cloud.

Some embodiments of the present invention may be described in relation to FIG. 7. In these embodiments, an image captured by a mobile handset, region-of-interest information and a metadata tag indicating whether, or not, a user refined the region-of-interest may be received 700 in a cloud. The cloud may process 702 the received image. Exemplary processing may include, tone correction, illumination correction, geometric correction, perspective distortion correction, sharpening, de-noising, de-blurring, resolution boosting, image enhancement, image restoration and other processing intended to generate a processed result of greater utility to an end-viewer. In some embodiments of the present invention, the processing may be specific to the region-of-interest. In some embodiments of the present invention, the processing in the cloud may perform region-of-interest detection. In some of these embodiments, if the metadata tag indicates that the region-of-interest provided from the handset was user refined, then the region-of-interest provided by the handset may be given priority over the cloud-detected region-of-interest. In alternative embodiments, the cloud may use the received region-of-interest as an initial estimate for a region-of-interest detection process. The cloud-processed result may be transmitted 704 to the handset.

Figure 8:
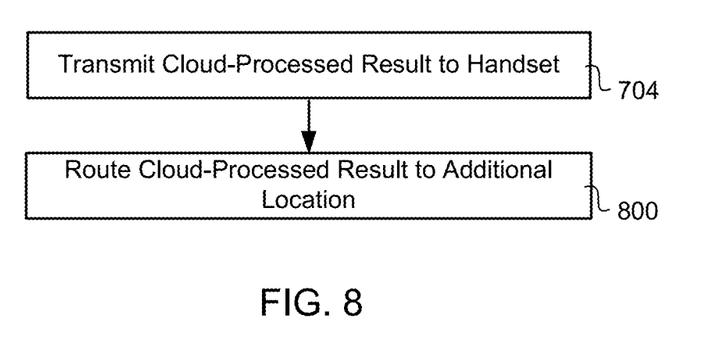
FIG. 8 is a chart showing exemplary embodiments of the present invention comprising transmitting cloud-processed results from the cloud to the handset and an additional location.

In alternative embodiments, shown in FIG. 8, of the present invention, cloud-processed result may be transmitted 704 to the handset, and the cloud-processed result may be routed 800, by the cloud, to an additional location, for example, another device, an email account and other locations. In some embodiments of the present invention, the additional location may be predefined. In alternative embodiments, an additional-location identifier may be transmitted from the handset to the cloud as metadata with the captured image sent to the cloud for processing.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that software, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:
1. A method for image correction, said method comprising:
capturing an image in a handset, wherein said capturing comprises:
generating real-time capture feedback comprising an acquisition-factor value; and
providing said real-time capture feedback for display on a display associated with said handset;
determining an acceptability indicator associated with said acquisition-factor value;
in said handset, determining a region-of-interest in said image;
forming a region-of-interest modification metadata tag, wherein said region-of-interest modification metadata tag indicates whether, or not, said region-of-interest is a modified region-of-interest relative to an automatically determined region-of-interest; and transmitting, to a cloud, said image, a location identifier associated with said region-of-interest and said region-of-interest modification metadata tag.

2. A method as described in claim 1 further comprising receiving from said cloud a cloud-processed result.

3. A method as described in claim 2, wherein said cloud-processed result is a version of said image processed by at least one process selected from the group of processes consisting of illumination correction, perspective distortion correction, tone correction, sharpening, de-noising, de-blurring and resolution boosting.

4. A method as described in claim 2 further comprising routing, from said handset to an additional location, said cloud-processed result.

5. A method as described in claim 1, wherein said determining comprises:
 detecting a first region-of-interest;
 displaying said first region-of-interest on said display associated with said handset;
 receiving a region-of-interest confirmation associated with said first region-of-interest; and
 setting said region-of-interest to said first region-of-interest.

6. A method as described in claim 1, wherein said determining comprises:
 detecting a first region-of-interest;
 displaying said first region-of-interest on said display associated with said handset;
 receiving a modified region-of-interest; and
 setting said region-of-interest to said modified region-of-interest.

7. A method as described in claim 1 further comprising:
 generating a low-resolution version of said image;
 processing said low-resolution version of said image to form a preview image; and
 displaying said preview image on said display associated with said handset.

8. A method as described in claim 7, wherein said processing said low-resolution version of said image comprises at least one process selected from the group of processes consisting of illumination correction, perspective distortion correction, tone correction, sharpening, de-noising, de-blurring and resolution boosting.

9. A method as described in claim 1 further comprising transmitting to said cloud a first metadata tag associated with routing information.

10. A method as described in claim 1 further comprising transmitting to said cloud a first metadata tag associated with an image acquisition parameter.

11. A method as described in claim 1 further comprising displaying said real-time capture feedback and said acceptability indicator on said display associated with said handset.

12. A method for image correction, said method comprising:
 receiving, in a cloud from a handset, an image, a region-of-interest identifier and a region-of-interest modification metadata tag, wherein said region-of-interest modification metadata tag indicates whether, or not, said region-of-interest is a modified region-of-interest relative to an automatically determined region-of-interest;
 processing said image; and
 transmitting, to said handset, a cloud-processed result.

13. A method as described in claim 12 further comprising transmitting said cloud-processed result to an additional location.

14. A method as described in claim 13, wherein routing information identifying said additional location is sent as a first metadata from said handset to said cloud.

15. A method as described in claim 12, wherein:
 said processing determines a cloud-detected region-of-interest when said region-of-interest modification metadata tag indicates said region-of-interest is not a modified region-of-interest; and
 said processing uses said transmitted region-of-interest when said region-of interest modification metadata tag indicates said region-of-interest is a modified region-of-interest.

16. A method as described in claim 12, wherein:
 said processing determines a cloud-detected region-of-interest when said region-of-interest modification metadata tag indicates said region-of-interest is not a modified region-of-interest; and
 said processing refines said transmitted region-of-interest when said region-of-interest modification metadata tag indicates said region-of-interest is a modified region-of-interest.

17. A method as described in claim 12, wherein said processing comprises at least one process selected from the group of processes consisting of illumination correction, perspective distortion correction, tone correction, sharpening, de-noising, de-blurring and resolution boosting.

18. A method for image correction, said method comprising:
 capturing an image in a handset, wherein said capturing comprises:
  generating real-time capture feedback comprising an acquisition-factor value; and
  providing said real-time capture feedback for display on a display associated with said handset;
 determining an acceptability indicator associated with said acquisition-factor value;
 in said handset, determining a region-of-interest in said image;
 forming a region-of-interest modification metadata tag, wherein said region-of-interest modification metadata tag indicates whether, or not, said region-of-interest is a modified region-of-interest relative to an automatically determined region-of-interest;
 transmitting, to a cloud, said image, a location identifier associated with said region-of-interest and said region-of-interest modification metadata tag;
 receiving, in said cloud from said handset, said image, said location identifier associated with said region-of-interest and said region-of-interest modification metadata tag;
 processing, in said cloud, said image; and
 transmitting, to said handset from said cloud, a cloud-processed result.

19. A method as described in claim 18 further comprising receiving, at said handset from said cloud, said cloud-processed result.

20. A method as described in claim 18, wherein said processing comprises at least one process selected from the group of processes consisting of illumination correction, perspective distortion correction, tone correction, sharpening, de-noising, de-blurring and resolution boosting.

21. A method as described in claim 18 further comprising routing, from said handset to an additional location, said cloud-processed result.

22. A method as described in claim 18, wherein said determining comprises:
- detecting a first region-of-interest;
- displaying said first region-of-interest on said display associated with said handset;
- receiving a region-of-interest confirmation associated with said first region-of-interest; and
- setting said region-of-interest to said first region-of-interest.

23. A method as described in claim 18, wherein said determining comprises:
- detecting a first region-of-interest;
- displaying said first region-of-interest on said display associated with said handset;
- receiving a modified region-of-interest; and
- setting said region-of-interest to said modified region-of-interest.

24. A method as described in claim 18 further comprising:
- generating a low-resolution version of said image;
- processing said low-resolution version of said image to form a preview image; and
- displaying said preview image on said display associated with said handset.

25. A method as described in claim 24, wherein said processing said low-resolution version of said image comprises at least one process selected from the group of processes consisting of illumination correction, perspective distortion correction, tone correction, sharpening, de-noising, de-blurring and resolution boosting.

26. A method as described in claim 18 further comprising transmitting to said cloud a first metadata tag associated with routing information.

27. A method as described in claim 18 further comprising transmitting to said cloud a first metadata tag associated with an image acquisition parameter.

28. A method as described in claim 18 further comprising displaying said real-time capture feedback and said acceptability indicator on said display associated with said handset.

29. A method as described in claim 18 further comprising transmitting said cloud-processed result to an additional location from said cloud.

30. A method as described in claim 18, wherein:
- said processing determines a cloud-detected region-of-interest when said region-of-interest modification metadata tag indicates said region-of-interest is not a modified region-of-interest; and
- said processing uses said transmitted region-of-interest when said region-of interest modification metadata tag indicates said region-of-interest is a modified region-of-interest.

31. A method as described in claim 18, wherein:
- said processing determines a cloud-detected region-of-interest when said region-of-interest modification metadata tag indicates said region-of-interest is not a modified region-of-interest; and
- said processing refines said transmitted region-of-interest when said region-of interest modification metadata tag indicates said region-of-interest is a modified region-of-interest.

* * * * *